(12) United States Patent
Koike

(10) Patent No.: US 6,684,233 B1
(45) Date of Patent: Jan. 27, 2004

(54) ADAPTIVE FILTER, CONTROL METHOD OF ADAPTIVE FILTER AND STORAGE MEDIUM STORING THEREIN PROGRAM THEREOF

(75) Inventor: Shinichi Koike, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/573,184

(22) Filed: May 18, 2000

(30) Foreign Application Priority Data

May 20, 1999 (JP) ............................................ 11-140632

(51) Int. Cl.[7] ............................................... G06F 17/10
(52) U.S. Cl. ...................................................... 708/322
(58) Field of Search .................................. 708/322, 323

(56) References Cited

U.S. PATENT DOCUMENTS

| | | | | |
|---|---|---|---|---|
| 5,608,804 A | * | 3/1997 | Hirano | ..................... 381/71.12 |
| 5,784,304 A | * | 7/1998 | Koike | ......................... 708/322 |
| 6,198,819 B1 | * | 3/2001 | Farrell et al. | .......... 379/406.08 |
| 6,223,194 B1 | * | 4/2001 | Koike | ......................... 708/322 |

FOREIGN PATENT DOCUMENTS

| | | |
|---|---|---|
| JP | 3-65976 | 6/1991 |
| JP | 8-213880 | 8/1996 |

\* cited by examiner

*Primary Examiner*—David H. Malzahn
(74) *Attorney, Agent, or Firm*—Scully, Scott, Murphy & Presser

(57) ABSTRACT

An adaptive filter, a control method of the adaptive filter, and a storage medium storing therein a program for executing the control method thereof enable a tap weight control method to be provided in order to realize high speed convergence of an adaptive filter using sign-sign algorithm. The adaptive filter having a non-recursive filter obtains a correlation value in such a way that a sum between an error signal and an additive noise is multiplied by a value in every respective taps of input signal. The correlation value undergoes operation of a correlation non-linear processor to obtain a value. Such the value is multiplied by a step gain. An obtained product is utilized for updating above described respective tap weight coefficients. It causes a power-number of a power function to be controlled according to an estimated value of an electric power of the error signal while taking the non-linear function of the correlation non-linear processor to be the power function of the correlation value. The estimated value is obtained in such a way that it causes average value of the correlation value to be calculated by a leakage accumulator before squaring the average value.

8 Claims, 5 Drawing Sheets

ADAPTIVE FILTER, CONTROL METHOD OF ADAPTIVE FILTER AND STORAGE MEDIUM STORING THEREIN PROGRAM THEREOF

BACKGROUND OF THE INVENTION

The present invention relates to an adaptive filter, a control method of an adaptive filter and a storage medium storing therein a program thereof. More to particularly, this invention relates to an adaptive filter which is suitable for use in an echo canceller which is employed in data transmission and in an acoustic system, an automatic equalizer for digital data transmission, or further generally use in identification of unknown system or so forth, and a control method for implementing tap weight control of this adaptive filter, and a storage medium storing therein a program for executing such control method.

DESCRIPTION OF THE PRIOR ART

Firstly, there is described the principles of adaptive filter.

FIG. 1 is a principle view of the adaptive filter. In FIG. 1, the adaptive filter 100 prepares an estimated value of unknown signal series from a known filter input signal series. The adaptive filter 100 updates a parameter belonging to the filter on the basis of signal series of error between such the estimated value series and the unknown signal series. The adaptive filter 100 identifies unknown system 101 rightly.

Additive noise at the time of ordinary observation is added to the unknown signal series. The adaptive filter 100 converges from initial state of unlearned to final state. Further, in frequent cases, the unknown signal series is given as the answer to the above-described signal series of the unknown system 101. This case is corresponding to the echo canceller and/or the automatic equalizer.

In frequent cases, the adaptive filter is materialized as a non-recursive filter (FIR; Finite Impulse Response). As shown in FIG. 2, the adaptive filter has constitution using delay unit of plural stages. FIG. 2 shows a control circuit of the k-th tap weight. Here, it causes the k-th tap weight $c_k^{(n)}$ to be controlled while obtaining correlation value using the sum between an error signal $e^n$ and an additive noise $v^n$ and a filter input signal $a_{n-k}$ in such the tap. In FIG. 2, "n" is the time, "$a_n$" is an input signal, and "$a_c$" is a step gain.

Now, a tap weight control algorithm uses a correlation value obtained in such a way that the sum between the error signal and the additive noise is multiplied by the input signal. As the tap weight control algorithm, next LMS algorithm is well known. Further, it is utilized widely.

It can be written as follows about the k-th tap weight:

$$c_k^{(n+1)} = c_k^{(n)} + \alpha_c(e_n + v_n)a_{n-k} \quad (1)$$

Next, another tap weight control algorithm uses a correlation value obtained in such a way that the polarity of the sum between the error signal and the additive noise is multiplied by the polarity of the input signal. As the tap weight control algorithm, next sign-sign algorithm is well known.

It can be written as follows about the k-th tap weight:

$$c_k^{(n+1)} = c_k^{(n)} + \alpha_c \text{sgn}(e_n + v_n)\text{sgn}(a_{n-k}) \quad (2)$$

Here, sgn ( ) is polarity function, thus if factor is positive (or negative), "+1" (or "−1") is outputted.

The above-described sign-sign algorithm can be materialized very easily because the polarity is multiplied by the polarity. Simultaneously, there is advantage that the operation is stabilized when there is large domestic trouble in the additive noise and the input signal. However, there is the fault that convergence of the filter is slow in comparison with the above described LMS algorithm.

Consequently, it is desired that it causes speedy convergence which the LMS algorithm has to be realized while making the best use of above characteristic of the sign-sign algorithm.

SUMMARY OF THE INVENTION

In view of the foregoing, it is an object of the present invention, in order to overcome the above mentioned problem, to provide an adaptive filter, a control method of the adaptive filter and storage medium storing therein a program thereof which realize the adaptive filter and its tap weight control method, and which is fit of domestic trouble after convergence, and which are sign-sign algorithm with high-speed convergence.

According to a first aspect of the present invention, in order to achieve the above mentioned object, there is provided an adaptive filter having non-recursive filter, which acquires a correlation value obtained in such a way that a sum between an error signal and an additive noise is multiplied by a value of input signal in respective taps, before updating weight coefficient of the respective taps according to a product between a value which is obtained in such a way that the correlation value undergoes action of non-linear function and a step gain, the adaptive filter comprises a control means for controlling a power-number of a power function on the basis of an estimated value of electric power of said error signal while taking said non-linear function to be the power function of said correlation value.

According to a second aspect of the present invention, in the first aspect, there is provided an adaptive filter, wherein the control means consists of an estimation means for obtaining an estimated value of the error signal from an average value of the correlation value, and a power generation means for generating the power on the basis of the estimated value.

According to a third aspect of the present invention, in the second aspect, there is provided an adaptive filter, wherein the power-number generation means consists of a comparison means for comparing the estimated value with a threshold value, and a calculation means for calculating power-number which is either the maximum value or "0" (zero) from comparison result of the comparison means.

According to a fourth aspect of the present invention, in the second aspect, there is provided an adaptive filter, wherein the power-number generation means consists of a conversion means for converting the estimated value into a decibel value, and a calculation means for calculating a power-number while using the decibel value, a minimum decibel value, and a maximum decibel value.

According to a fifth aspect of the present invention, there is provided a control method of an adaptive filter in which the adaptive filter having non-recursive filter, which acquires a correlation value obtained in such a way that a sum between an error signal and an additive noise is multiplied by a value of input signal in respective taps, before updating weight coefficient of the respective taps according to product between a value which is obtained in such a way that the correlation value undergoes action of non-linear function and a step gain, the adaptive filter comprising the step of controlling a power-number of a power function on the basis of an estimated value of an electric power of the error signal while taking the non-linear function to be the power function of the correlation value.

According to a sixth aspect of the present invention, there is provided a storage medium storing therein a program for executing processing of a control method of an adaptive filter in which the adaptive filter having non-recursive filter, which acquires a correlation value obtained in such a way that a sum between an error signal and an additive noise is multiplied by a value of input signal in respective taps, before updating weight coefficient of the respective taps-according to product between a value which is obtained in such a way that the correlation value undergoes action of non-linear function and a step gain, the adaptive filter comprising the step of controlling a power-number of a power function on the basis of an estimated value of an electric power of the error signal while taking the non-linear function to be the power function of the correlation value.

The above and further objects and novel features of the invention will be more fully understood from the following detailed description when the same is read in connection with the accompanying drawings. It should be expressly understood, however, that the drawings are for purpose of illustration only and are not intended as a definition of the limits of the invention.

DETAILED DESCRIPTION OF THE PREFERRED EMBODIMENTS

A preferred embodiment of the present invention will be described in detail in accordance with the accompanying drawings.

Firstly, there will be described a present embodiment in accordance with principle.

It is capable of being written the above-mentioned tap weight update expression of the sign-sign algorithm as follows:

$$c_k^{(n+1)} = c_k^{(n)} + \alpha_c \mathrm{sgn}\{(e_n+v_n)a_{n-k}\} \tag{3}$$

The next generalized update expression is introduced from such the expression (3).

$$c_k^{(n+1)} = c_k^{(n)} + \alpha_c f(z_k^{(n)}) \tag{4}$$

Here, $$z_k^{(n)} = (e_n+v_n)a_{n-k} \tag{5}$$

The expression (5) is correlation value. The function "f ( )" is generally non-linear function and is odd function. In such the algorithm, it causes non linear processing to be given while causing the correlation value $z_k^{(n)}$ to undergo the non linear function, thus it can be called as "correlation non linear algorithm".

Various kinds of forms are possible as the non linear function as mentioned above. Now following a power function (odd function) is proposed.

$$f(z) = \mathrm{sgn}(z)|z|^r \tag{6}$$

Here, on the supposition that "a ^b" dictates the b-th power of the number a. Further, the power is taken as $r \geq 0$, particularly, r=0: sign-sign algorithm r=1: LMS algorithm r=3: least fourth-power average error (LMF) algorithm
thus various algorithms are obtained according to value of "r".

Next, it causes this power function to be applied to above updating of the tap weight. On this occasion, on the supposition that it causes the value of power to be performed adaptive control. Namely, update expression of the k-th tap weight becomes as follows:

$$c_k^{(n+1)} = c_k^{(n)} + \alpha_c \mathrm{sgn}(z_k^{(n)})|z_k^{(n)}|^{r_k^{(n)}} \tag{7}$$

Here, $r_k^{(n)}$ is the power-number in the time "n".

Now, the power-number $r_k^{(n)}$ is given as the function of estimated value $P_k^{(n)}$ of the electric power of an error signal as follows:

$$r_k^{(n)} = g(P_k^{(n)}) \tag{8}$$

Further, the electric power estimated value $P_k^{(n)}$ is obtained by following procedure, while raising 2 to average quantity $q_k^{(n)}$ which is obtained by leakage accumulator with the above $z_k^{(n)}$ as the input:

$$P_k^{(n)} = (q_k^{(n)})^2 \tag{9}$$

$$q_k^{(n+1)} = (1-\rho)q_k^{(n)} + \rho z_k^{(n)} \tag{10}$$

Provided that $\rho$ is leakage coefficient.

Various forms are assumed about the function g ( ). However next two forms are practical.

(a) Step Shaped Variation Type $$g(P) = \begin{cases} r_{\max} & \text{for } P > P_{th} \\ 0 & \text{for } P < P_{th} \end{cases} \tag{11}$$

Figure 5A:
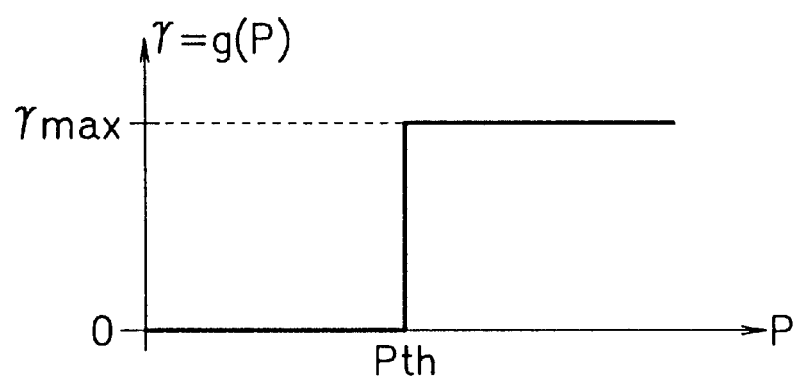
FIGS. 5A and 5B are graphs showing function example giving the power according to the embodiment of the present invention.

Here, $P_{th}$ is electric power threshold value, and $r_{max}$ is the maximum value of the power-number can be taken. FIG. 5A is a graph showing above g(P).

(b) Logarithmic Linear Type $$g(P) = \begin{cases} r_{max} \text{ for } P(dB) > P_{max}(dB) \\ r_{max}\{P(dB) - P_{min}(dB)\}/\{P_{max}(dB) - P_{min}(dB)\} \\ \quad \text{for } P_{min}(dB) < P(dB) < P_{max}(dB) \\ 0 \text{ for } P(dB) < P_{min}(dB) \end{cases} \quad (12)$$

Here, P(dB), maximum electric power value $P_{max}$ (dB), and minimum electric power value $P_{min}$ (dB) are quantity represented by using decibel.

Figure 5B:
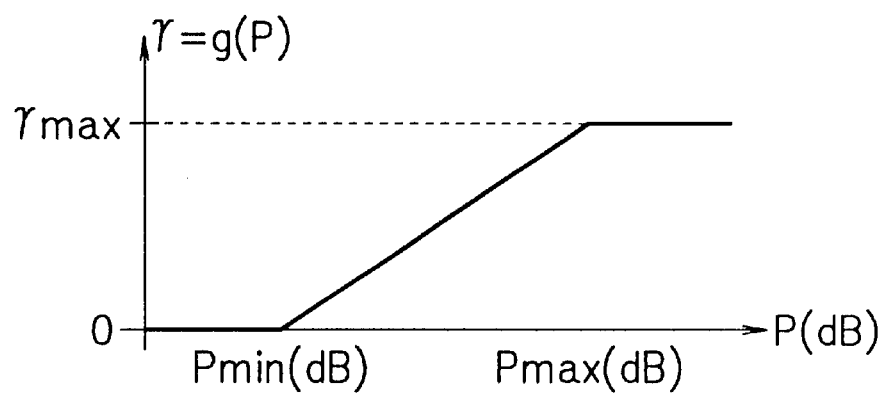

FIG. 5B is a graph showing above g(P).

Next, there will be described the embodiment of the present invention on the basis of the principles described above.

Figure 1:
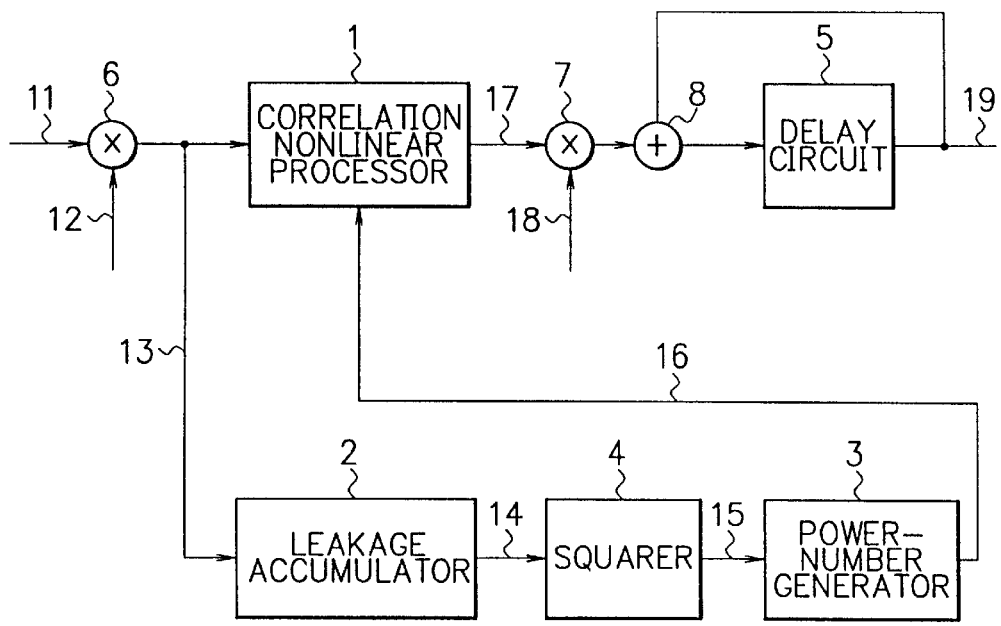
FIG. 1 is a block diagram showing an adaptive filter using a tap weight control method according to an embodiment of the present invention.

FIG. 1 shows the adaptive filter according to the embodiment of the present invention.

In FIG. 1, an input signal 11 is $(a_{n-k})$. A sum 12 between an error signal and an additive noise is $(e_n+v_n)$. A correlation value 13 is $(z_k^{(n)})$. The correlation value 13; $(z_k^{(n)})$ is obtained in such a way that the input signal 11; $(a_{n-k})$ is multiplied by the sum 12; $(e_n+v_n)$. An average quantity 14 is $(q_k^{(n)})$. The average quantity 14; $(q_k^{(n)})$ is obtained in such a way that the correlation value 13; $(z_k^{(n)})$ is equalized by a leakage accumulator 2. Thus, the average quantity 14; $(q_k^{(n)})$ is outputted while equalizing the correlation value 13; $(z_k^{(n)})$ by a leakage accumulator 2. Such the average quantity 14; $(q_k^{(n)})$ is squared by a square means 4. Thus an estimated value 15; $(P_k^{(n)})$ of the error signal is obtained. Next, a power generator 3 outputs the power-number 16; $(r_k^{(n)})$ of the power function on the basis of the above described estimated value 15.

On the other hand, the correlation non-linear processor 1 outputs a signal 17 while executing processing according to the power function of the power 16 to the input signal 13. A multiplier 7 multiplies the signal 17 by a step gain 18, before the correlation non-linear processor 1 outputs a tap weight 19 $(c_k^{(n)})$ which is updated according to a delay circuit 5 operating one unit time and an adder 8.

Figure 2:
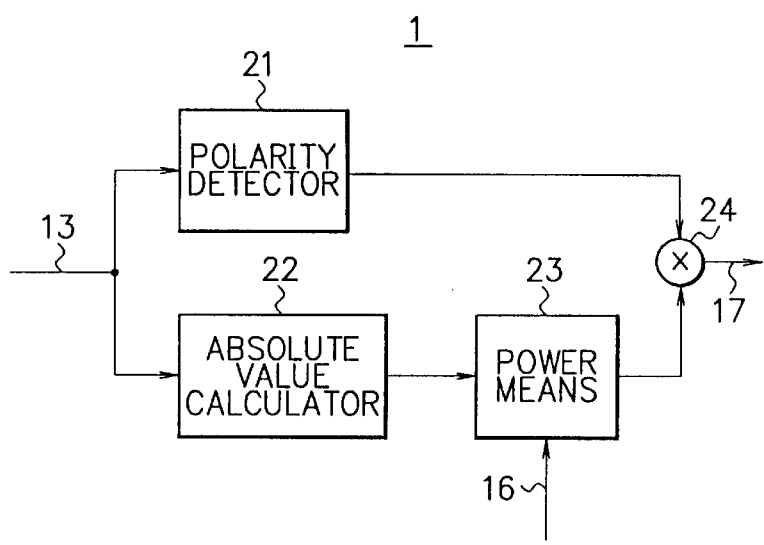
FIG. 2 is a block diagram showing a constitution of a correlation nonlinear processor of FIG. 1.

FIG. 2 shows a detailed constitution of the above correlation non-linear processor 1.

In FIG. 2, polarity is obtained from the input signal 13 according to a polarity detector 21. On the other hand, an absolute value calculator 22 calculates an absolute value of the input signal 13. It causes the power-number 16 to be raised to the obtained absolute value by a power means 23. Such the raised value is multiplied by the above polarity to obtain the product, thus such the product is outputted as the above signal 17.

Figure 3:
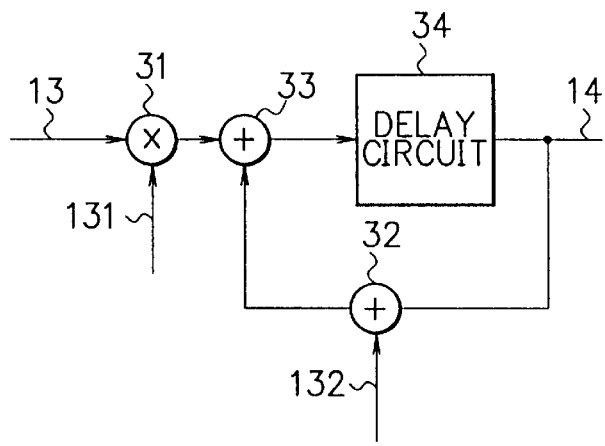
FIG. 3 is a block diagram showing a constitution of a leakage accumulator of FIG. 1.

FIG. 3 shows detailed constitution of the above leakage accumulator 2.

In FIG. 3, the input signal 13 is multiplied by a leakage coefficient 131 to obtain the product. The product is taken as one input of the adder 33. It causes the above average quantity 14 to be outputted while delaying the output of the adder 33 during only one unit time. Simultaneously, the average quantity 14 is multiplied by a complement 132 of the leakage coefficient by means of the multiplier 32. Such the product is taken as the other input of the above adder 33.

Figure 4A:
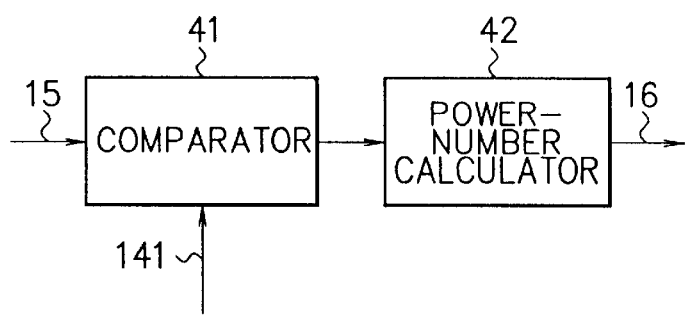
FIGS. 4A and 4B are block diagrams showing a power generator of FIG. 1.
Figure 4B:
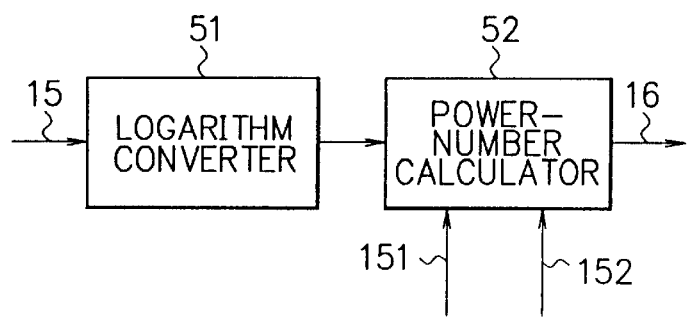

FIGS. 4A and 4B show detailed constitution of the power generator 3 according to the function g (P) described previously. FIG. 4A shows an example of the above step shaped variation type g (P). FIG. 4B shows an example of the above logarithmic linear type g (P).

In FIG. 4A, the electric power estimated value 15 of the inputted error signal is compared with an electric power threshold value 141 given beforehand by a comparator 41. Thus, it cases the power-number 16 to be outputted. The power-number calculator 42 outputs the power-number 16 which is either the maximum value or "0" (zero) on the basis of the comparison result.

In FIG. 4B, a logarithm converter 51 converts the electric power estimated value 15 of the inputted error signal into a decibel value. A power-number calculator 52 outputs the power-number 16 while using such the decibel value, the minimum electric power decibel value 151, and the maximum electric power decibel value 152.

Figure 6A:
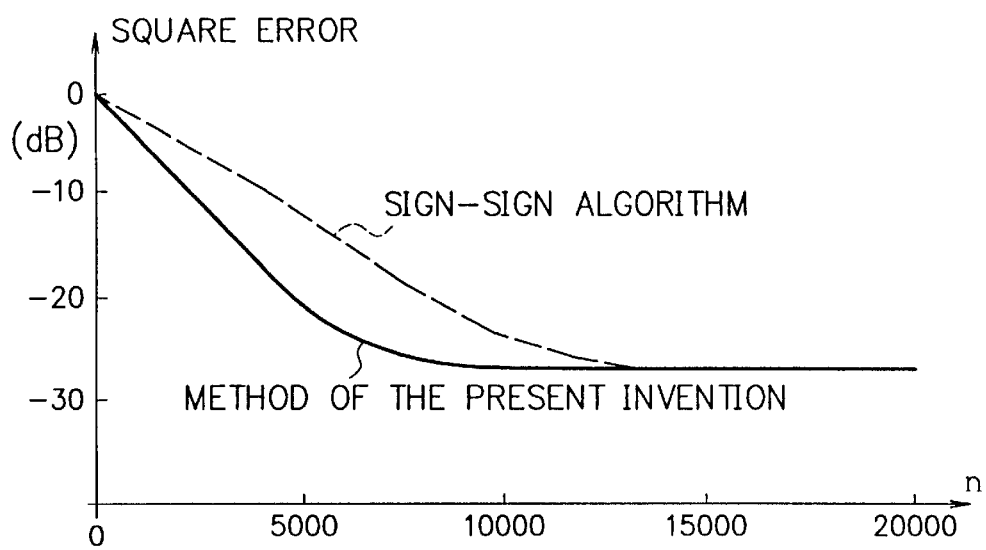
FIGS. 6A and 6B are graphs showing simulation result of the adaptive filter according to the embodiment of the present invention.
Figure 6B:
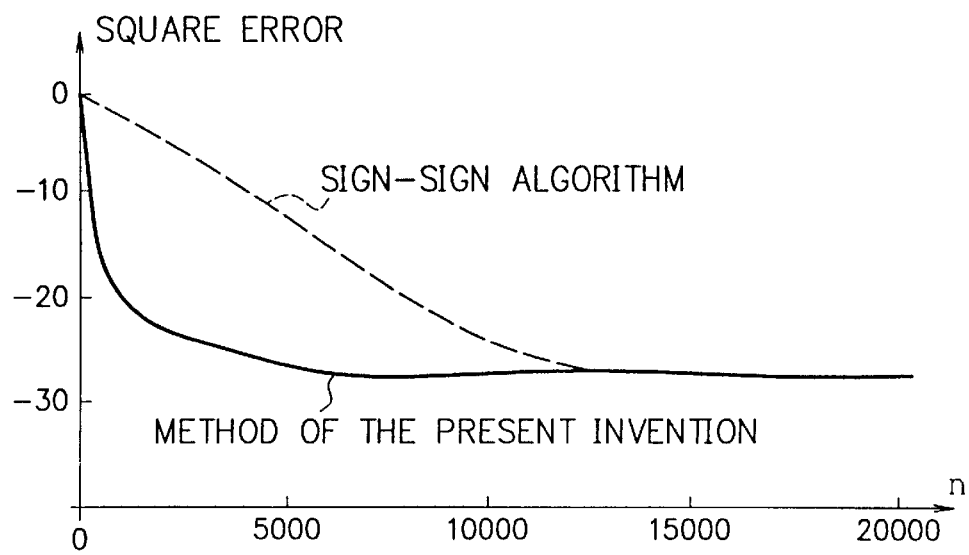
Figure 7:
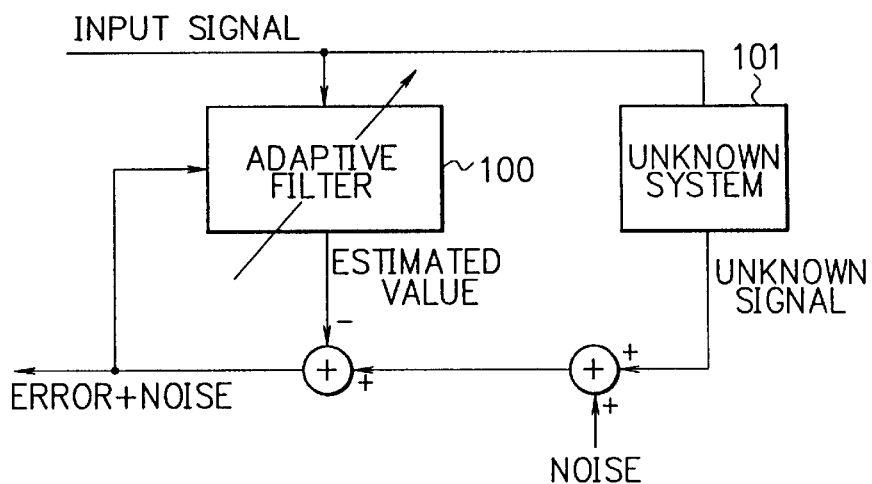
FIG. 7 is a block diagram showing principle of the adaptive filter.
Figure 8:
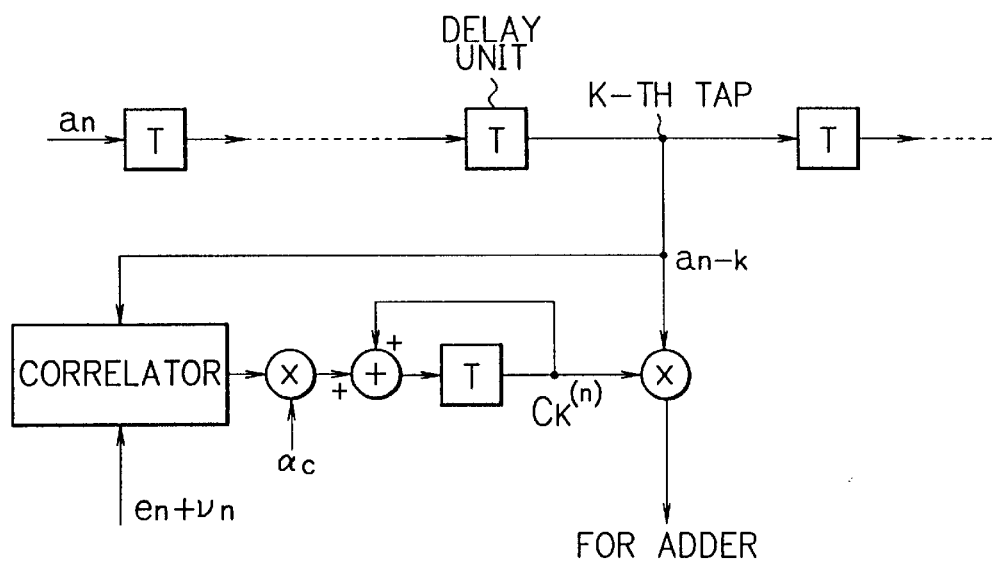
FIG. 8 is a block diagram explaining tap weight control algorithm of non-recursive type adaptive filter.

FIGS. 6A, and 6B show simulation result of convergence process of the adaptive filter according to the present embodiment. FIG. 6A shows example of simulation result of the convergence process of the adaptive filter in case of using "step shaped variation type" power-number generator (referring to FIG. 4A). FIG. 6B shows example of simulation result of the convergence process of the adaptive filter in case of using "logarithm linear type" power-number generator (referring to FIG. 4B).

In any result of the above FIGS. 6A, and 6B, it causes convergence speed to be high remarkably in comparison with the case of the conventional sign-sign algorithm. Further, the value of the power-number becomes 0 (zero) after convergence, thus it is confirmed that the method of the invention reaches the sign-sign algorithm.

Furthermore, in the case where it causes the present embodiment to be constituted by the computer system consisting of storage device such as CPU, ROM, and so forth, thus above described storage device constitutes the storage medium according to the present invention. The storage medium stores therein a program for executing processing for performing operation described in the above described embodiment.

Moreover, it is capable of employing a semiconductor storage device, an optical disk, a magneto-optical disk, a magnetic recording medium, and so forth as the storage medium.

As described above, according to the present invention, in the adaptive filter using the sign-sign algorithm, the present invention becomes tough to the domestic trouble after convergence, and also enables convergence speed to be high.

While preferred embodiments of the invention have been described using specific terms, the description has been for illustrative purposes only, and it is to be understood that changes and variations may be made without departing from the spirit or scope of the following claims.

What is claimed is:

1. An adaptive filter system that is employed in data transmission having a non-recursive filter that updates tap weights, said filter system comprising:

a receiving means for receiving an input signal, an error signal and a noise signal, and outputting a correlation value that a product of said input signal multiplied by a sum of said error signal and said noise signal;

a leakage accumulator means for averaging said correlation value, and outputting an average value;

a squarer means for squaring said average value, and outputting an estimated value of power defined as a square of said average value;

an exponent generator means for generating an exponent from said estimated value of power;

a correlation nonlinear processor for executing a nonlinear process which is a function of said estimated value of power; and a feedback circuit for updating said tap weights based upon a output signal from said correlation nonlinear processor, said feedback circuit further comprising a multiplier, a delay circuit and an adder.

2. The adaptive filter system claimed in claim 1, said correlation nonlinear processor comprises:

a polarity detector means for obtaining a polarity of said correlation value;

an absolute value calculator means for calculating an absolute value of said correlation value;

a means for calculating said absolute value raised to the power of said exponent; and said correlation nonlinear processor outputs a signal to the feedback circuit said signal is obtained by multiplying said polarity with said exponent power of the absolute value of the correlation value.

3. An adaptive filter as claimed in claim 2, wherein said exponent generator means consists of a comparison means for comparing said estimated value with a threshold value of power, and a calculation means for calculating an exponent which is either the maximum value or "0" (zero) on the basis of comparison result of said comparison means.

4. The adaptive filter as claimed in claim 2, wherein said exponent generator means consists of a conversion means for converting said estimated value into a decibel value, and a calculation means for calculating an exponent while using said decibel value, a minimum decibel value, and a maximum decibel value.

5. The adaptive filter system claimed in claim 1, said exponent generator further comprising a comparator circuit and an exponent calculator means, said comparator circuit comparing said estimated value of power with a power threshold value.

6. The adaptive filter system claimed in claim 1, said exponent generator further comprising a logarithm converter and an exponent calculator means, said exponent generator converting said estimated value of power into a decibel value.

7. A control method for an adaptive filter in which said adaptive filter has a non-recursive filter that is employed in data transmission that updates tap weights, said control method comprising the steps of:

receiving an input signal, an error signal and a noise signal;

calculating a correlation value defined as said input signal multiplied by a sum of said error signal and said noise signal;

calculating an average value defined as an average of said correlation value;

calculating an estimated value of power defined as a square of said average value;

generating an exponent from said estimated value of power;

comparing said estimated value of power with a power threshold value;

calculating a polarity of said correlation value;

calculating an absolute value of said correlation value; and updating said tap weight by a quantity defined as multiplying said polarity of said correlation value with said absolute value raised to the power of said exponent.

8. A program storage device readable by machine, tangibly embodying a program of instruction executable by the machine to perform method steps for executing processing of a control method of an adaptive filter has a non-recursive filter which is employed in data transmission having a non-recursive filter that update tap weights said storage device consists of a computer system with a dynamic or static storage device, the method comprising:

receiving an input signal and noise signal;

averaging a correlation value said correlation value is a product of said input signal multiplied by a sum of said noise signal and an error signal, whereby a leakage accumulator outputs an average value;

estimating a value of power of said error signal by squaring said average value;

generating an exponent of an exponential function based on said estimated value of power, an exponent generator including a comparator circuit and an exponent calculator means, said comparator circuit comparing said estimated value of said power with a power threshold value;

outputting an output signal, said output signal obtained after said input signal is inputted to a correlation nonlinear processor and processed through an exponential function with an exponent generated from said exponent generator; and wherein said tap weights are updated by multiplying said output signal and a step gain using a multiplier for generating a first signal and then adding said first signal and delaying said obtaining first signal at one unit time for generating a second signal using a delay circuit, and adding said second signal and said output signal using an adder.

* * * * *